United States Patent [19]

Oikawa et al.

[11] Patent Number: 5,870,703
[45] Date of Patent: Feb. 9, 1999

[54] ADAPTIVE BIT ALLOCATION OF TONAL AND NOISE COMPONENTS

[75] Inventors: Yoshiaki Oikawa; Kyoya Tsutsui, both of Kanagawa; Shinji Miyamori; Masatoshi Ueno, both of Tokyo, all of Japan

[73] Assignee: Sony Corporation, Tokyo, Japan

[21] Appl. No.: 489,974

[22] Filed: Jun. 13, 1995

[30] Foreign Application Priority Data

Jun. 13, 1994 [JP] Japan ................................ 6-130655

[51] Int. Cl.⁶ .................................................. G01L 5/00
[52] U.S. Cl. .......................................... 704/206; 704/229
[58] Field of Search .................................. 704/205–209, 704/229, 230, 226–228; 381/2

[56] References Cited

U.S. PATENT DOCUMENTS

| | | | |
|---|---|---|---|
| 4,184,049 | 1/1980 | Crochiere et al. | 395/2.38 |
| 4,535,472 | 8/1985 | Tomcik | 395/2.38 |
| 4,713,776 | 12/1987 | Araseki | 395/2.38 |
| 4,964,166 | 10/1990 | Wilson | 395/2.38 |
| 5,042,069 | 8/1991 | Chhatwal et al. | 395/2.38 |
| 5,109,417 | 4/1992 | Fielder et al. | 395/2.14 |
| 5,115,240 | 5/1992 | Fujiwara et al. | 341/51 |
| 5,128,963 | 7/1992 | Akagiri | 375/244 |
| 5,142,656 | 8/1992 | Fielder et al. | 395/2.38 |
| 5,185,800 | 2/1993 | Mahieux | 395/2.91 |
| 5,235,671 | 8/1993 | Mazor | 395/2.09 |
| 5,264,846 | 11/1993 | Oikawa | 341/76 |
| 5,268,685 | 12/1993 | Fujiwara | 341/76 |
| 5,294,925 | 3/1994 | Akagiri | 341/50 |
| 5,301,205 | 4/1994 | Tsutsui et al. | 375/200 |
| 5,341,457 | 8/1994 | Hall, II et al. | 704/226 |

(List continued on next page.)

FOREIGN PATENT DOCUMENTS

| | | | |
|---|---|---|---|
| 0 423 050 A1 | 4/1991 | European Pat. Off. | H04B 1/66 |
| 0 424 016 A2 | 4/1991 | European Pat. Off. | H04B 1/66 |
| 0 428 156 A2 | 5/1991 | European Pat. Off. | H03M 7/30 |
| 0 446 031 A3 | 9/1991 | European Pat. Off. | H04B 1/66 |
| 0 506 394 A2 | 9/1992 | European Pat. Off. | G10L 7/00 |
| 0 525 809 A2 | 2/1993 | European Pat. Off. | H04B 1/66 |
| 0645769 A2 | 3/1995 | European Pat. Off. | G11B 20/00 |
| 0 653 846 A1 | 5/1995 | European Pat. Off. | H03M 7/30 |
| 0653846 A1 | 5/1995 | European Pat. Off. | H03M 7/30 |
| 0692880 A1 | 1/1996 | European Pat. Off. | H03M 7/30 |
| 6-149292 | 5/1994 | Japan | G10L 9/08 |
| WO94/28633 | 12/1994 | WIPO | H03M 7/30 |

(List continued on next page.)

OTHER PUBLICATIONS

J. Rothweiler, "Polyphase Quadrature Filters—A New Sub-band Coding Technique," ICASSP Boston, Apr. 14–16, 1983, vol. 3 of 3, pp. 1280–1283.

"High Quality Digital Audio Encoding with 3.0 Bits/Sample Using Adaptive Transform Coding," Schröder et al.—AES Mar. 4–7, 1986 Montreux, Switzerland—pp. 1–7.

"Transform Coding of Audio Signals Using Perceptual Noise Criteria", Johnston—IEEE Journal on Selected Areas In Communications, vol. 6, No. 2, Feb. 1988—pp. 314–323.

"ASPEC: Adaptive spectral entropy coding of high quality music signals AES 90th Convention", Feb. 19–22, 1991 Paris—Preprint 3011 (A–4)—pp. 1–10 and Figs. 1 & 2.

"Digital Coding of Speech in Sub–bands", Crochiere et al., The Bell System Technical Journal, vol. 55, No. 8, Oct. 1976.

(List continued on next page.)

Primary Examiner—David D. Knepper
Attorney, Agent, or Firm—Limbach & Limbach L.L.P.

[57] ABSTRACT

The input signal of one of the plural channels is converted by a converting circuit into frequency components which are separated into tonal components and noise components in a signal comment separating circuit. The tonal components and the signal components are encoded by a tonal component encoding circuit and a noise component encoding circuit, respectively. The amount of bytes allocated to the noise components in the respective channels is determined by a byte allocation circuit based upon time changes of the sum of the scale factors of the respective channels.

8 Claims, 9 Drawing Sheets

U.S. PATENT DOCUMENTS

| | | | |
|---|---|---|---|
| 5,375,189 | 12/1994 | Tsutsui | 395/2.38 |
| 5,381,143 | 1/1995 | Shimoyoshi et al. | 341/51 |
| 5,454,011 | 9/1995 | Shimoyoshi | 375/240 |
| 5,461,378 | 10/1995 | Shimoyoshi et al. | 341/51 |
| 5,471,558 | 11/1995 | Tsutsui | 395/2.28 |
| 5,583,962 | 12/1996 | Davis et al. | 704/229 |
| 5,680,130 | 10/1997 | Tsutsui et al. | 341/87 |
| 5,737,720 | 4/1998 | Miyamori et al. | 704/229 |

FOREIGN PATENT DOCUMENTS

| | | | |
|---|---|---|---|
| WO 95/01680 | 1/1995 | WIPO | H04B 14/04 |
| WO 95/12920 | 5/1995 | WIPO | H03M 7/30 |
| WO 95/27335 | 10/1995 | WIPO | H03M 7/30 |

OTHER PUBLICATIONS

"Subband/Transform Coding Using Filter Bank Designs Based on TIme Domain Aliasing Cancellation", Princen et al., 1987 IEEE, pp. 2161–2164.

"Adaptive Transform Coding of Speech Signals", Zelinski et al., IEEE Transactions on Acoustics, Speech, and Signal Processing, vol. ASSP–25, No. 4, Aug. 1977, pp. 299–309.

The Critical Band Coder—Digital Encoding of Speech Signals Based on the Perceptual Requirements of the Auditory System, Krasner, 1980 IEEE, vol. 1–3, pp. 327–331.

ADAPTIVE BIT ALLOCATION OF TONAL AND NOISE COMPONENTS

BACKGROUND OF THE INVENTION

This invention relates to a low bit rate encoder and a low bit rate encoding method for compression-encoding audio signals of multi-channel system, a low bit rate decoder and a low bit rate decoding method for decoding compression-coded signals, and recording media on which signals encoded by such encoder/encoding method are recorded, which are used in cinema film projection systems or stereo or multi-sound acoustic systems such as video tape recorder or video disc player, etc.

Various efficient encoding techniques and devices for audio or speech signals, etc. are known.

As an example of an efficient encoding technique, there is a blocking frequency band division system, known as transform coding, for blocking, for example an audio signal, etc. in the time region every time unit to transform signals in the time domain every blocks into signals in the frequency domain (orthogonal transform) and thereafter to divide them into signal components in a plurality of frequency bands to encode those signal components for every respective frequency band.

Moreover, there can be enumerated sub-band coding (SBC) which is a non-blocking frequency band division system in which an audio signal, etc. in the time region is divided into signal components in a plurality of frequency bands without blocking it every unit time thereafter to encode them.

Further, there have been proposed efficient coding techniques and devices in which the sub-band coding and the transform coding described above are combined. In this case, for example, an input signal is divided into signal components in a plurality of frequency bands by the sub-band coding thereafter to orthogonally transform signals for every respective frequency band into signals in the frequency domain to implement coding to these orthogonally transformed signal components in the frequency domain.

Here, as a filter for frequency band division of the above-described sub-band coding, there is, for example, a filter known as QMF, etc. Such filter is described in, e.g. the literature "Digital coding of speech in subbands" R. E. Crochiere, Bell Syst. Tech. J. Vol. 55, No. 8, 1976. This filter of QMF serves to halve the frequency band into bands of equal bandwidth. This filter is characterized in that so called aliasing does not take place in synthesizing the above-mentioned divided frequency bands at later processing stage.

Moreover, in the literature "Polyphase Quadrature filters-A new subband coding technique", Joseph H. Rothweiler ICASSP 83, BOSTON, filter division technique of equal bandwidth is described. This polyphase quadrature filter is characterized in that division can be made at a time in dividing a signal into signal components in a plurality of frequency bands of equal bandwidth.

Further, as the above-described orthogonal transform processing, there is, for example, such an orthogonal transform system to divide an input audio signal into blocks by a predetermined unit time (frame) to carry out Fast Fourier Transform (FFT), Discrete Cosine Transform (DCT), or Modified DCT Transform (MDCT), etc. every respective blocks to thereby transform signals in the time domain into those in the frequency domain.

This MDCT is described in the literature "Subband/Transform Coding Using Filter Bank Designs Based on Time Domain Aliasing Cancellation", J. P. Princen and A. B. Bradley, Univ. of Surrey Royal Melbourne Inst. of Tech. ICASSP 1987.

Further, as frequency division width in the case of encoding (quantizing) respective frequency components divided into frequency bands, there is band division in which, for example, hearing sense characteristic of the human being is taken into consideration. Namely, there are instances where an audio signal is divided into signal components in plural (for example, 25) bands by a bandwidth such that the bandwidth becomes broader according as frequency shifts to higher frequency band side, which is generally called critical band.

In addition, in encoding data every respective bands at this time, coding by a predetermined bit allocation every respective bands or adaptive bit allocation every respective bands is carried out.

For example, in encoding coefficient data obtained after undergoing the MDCT processing by the above-mentioned bit allocation, coding is carried out by adaptive allocation bit number with respect to MDCT coefficient data every respective bands obtained by MDCT processing every respective blocks.

As the bit allocation technique and device therefor, the following two techniques and device are known.

For example, in the literature "Adaptive Transform Coding of Speech Signals", IEEE Transactions of Acoustics, Speech, and Signal Processing, vol. ASSP-25, No. 4, August 1977, bit allocation is carried out on the basis of magnitudes of signals every respective bands.

Moreover, for example, in the literature "The critical band coder—digital encoding of the perceptual requirements of the auditory system", M. A. Kransner MIT, ICASSP 1980, there are described the technique and the device in which necessary signal-to-noise ratios are obtained for every frequency bands by making use of the hearing sense masking to carry out fixed bit allocation.

Meanwhile, for example, in the efficient compression encoding system for audio signals using subband coding, etc. as described above, such a system to compress audio data by making use of the characteristic of the hearing sense of the human being so that its data quantity becomes equal to about ⅕ has been already put into practice.

It should be noted that there is a system called ATRAC (Adaptive Transform Acoustic Coding, a trademark of SONY Corporation) used in, e.g. MD (Mini Disc, a trademark of by SONY Corporation) as the efficient encoding system of compressing audio data so that its data quantity becomes equal to about ⅕.

However, in the efficient coding system utilizing the characteristic of the hearing sense of the human being, there are examples where the sound of a musical instrument or the voice of human being, etc. obtained by compression-coding a speech signal thereafter to decode that coded signal might be changed from original sound, although such a phenomenon takes place to a little degree. Particularly, in the case where this efficient coding system utilizing the characteristic of the hearing sense is used for recording format of recording media for which fidelity reproduction of original sound is required, realization of higher sound quality is required.

On the contrary, a format of such an efficient coding system (ATRAC system), etc. to compress audio signal so that its signal (data) quantity becomes equal to about ⅕ has been already put into practice, and hardware employing such a format is being popularized.

Accordingly, implementation of change or expansion having no compatibility with the format is disadvantageous not only to manufacture (makers) which have used the format but also to general users.

For this reason, it is expected that a device attain high sound quality based on encoding or decoding without changing the format thereof.

As the method of realization of higher sound quality except for the above, it is conceivable to mix linear PCM sound into ordinary compressed data. However, since compressed data of the efficient coding system and linear data are different in length of frame and time length per each frame, it is difficult to provide synchronization at the time of reproduction. Accordingly, it is very difficult to use these data of two formats at the same time.

Furthermore, not only in the case of ordinary audio equipment, but also in, for example cinema film projection systems, high definition television, or stereo or multi-sound acoustic system such as video tape recorder or video disc player, etc. audio signals of plural channels of 4~8 channels are being handled. Also in this case, efficient coding to reduce bit rate is expected.

Particularly, with cinema film, there are instances where, for example, digital audio signals, that is, a 8 channels of left channel, left center channel, center channel, right center channel, right channel, surround left channel, surround right channel and sub-woofer channel, are recorded. In this case, the above-mentioned efficient coding to reduce bit rate is required.

In particular, it is difficult to ensure, on the cinema film, the area capable of 8 channels of linearly quantized audio data of sampling frequency of 44.1 kHz and 16 bits as used in so called CD (Compact Disc), etc. Accordingly, compression of the audio data is required.

It should be noted that channels of 8 channel data recorded on the cinema film respectively correspond to left speaker, left center speaker, center speaker, right center speaker, right speaker, surround left speaker, surround right speaker, and sub-woofer speaker, which are disposed on the screen side where, for example, pictures reproduced from the picture recording areas of cinema film are projected by projector.

The center speaker is disposed in the center on the screen side, and serves to output reproduced sound by audio data of center channel. This center speaker outputs the most important reproduced sound, e.g. speech of an actor, etc.

The sub-woofer speaker serves to output reproduced sound by audio data of sub-woofer channel. This sub-woofer speaker effectively outputs sound which is perceived as vibration rather than sound in low frequency band, for example, sound of an explosion, and is frequently used effectively in a scene of explosion.

The left speaker and the right speaker are disposed on left and right sides of the screen, and serve to output reproduced sound by audio data of left channel and reproduced sound by audio data of right channel, respectively. These left and right speakers exhibit stereo sound effect.

The left center speaker is disposed between the left speaker and the center speaker, and the right center speaker is disposed between the center speaker and the right speaker. The left center speaker outputs reproduced sound by audio data of left center channel, and the right center speaker outputs reproduced sound by audio data of right center channel. These left and right center speakers perform auxiliary roles of the left and right speakers, respectively.

Particularly, in movie-theater having large screen and large number of persons to be admitted, etc. there is the drawback that localization of sound image becomes unstable in dependency upon seat positions. However, the above-mentioned left and right center speakers are added to thereby exhibit effect in creating more realistic localization of sound image.

Further, the surround left and right speakers are disposed so as to surround spectator's seats. These surround left and right speakers serve to respectively output reproduced sound by audio data of surround left channel and reproduced sound by audio data of surround right channel, and have the effect to provide reverberation or an impression of being surrounded by hand clapping or a shout of joy. Thus, it is possible to create sound images in a more three-dimensional manner.

In addition, since a defect, etc. is apt to take place on the surface of a medium of cinema film, if digital data is recorded as it is, missing data takes place to a great degree. Such a recording system cannot be employed from a practical point of view. For this reason, the capability of an error correcting code is very important.

Accordingly, with respect to the data compression, it is necessary to carry out compression processing to such a degree that recording can be made in the recording area on the film by taking bits for a correcting code into consideration.

From facts as described above, as the compression method of compressing digital audio data of 8 channels as described above, there is applied the efficient coding system (e.g. the ATRAC system) to attain sound quality comparable to CD by carrying out optimum bit allocation by taking into consideration the characteristic of the hearing sense of the human being as described above.

However, with this efficient coding system, the sound of a general musical instrument or the voice of the human being, etc. is varied from original sound similar to the above, although such a phenomenon takes place to a little degree. For this reason, in the case where such a system is employed in recording format for which reproduction having fidelity to original sound is required, any means for realizing higher sound quality is required.

This problem always exists as long as in the case where systems, except for the above-mentioned efficient coding system is used as multi-channel recording format in the cinema film, an irreversible compression system is employed from a viewpoint of ensuring the recording area.

Moreover, in the system of implementing efficient coding to audio signals of multi-channel systems as described above, data of respective channels are independently caused to undergo compression processing.

For this reason, even if, for example, a certain one channel is in unvoiced sound state, a fixed bit (byte) allocation amount is allocated to that channel.

Giving a fixed bit allocation amount to the channel in unvoiced sound state as stated above is redundant.

Moreover, since bit allocation amounts are the same also with respect to channel of signal of low level and channel of signal of high level, if bit allocation amounts are evaluated over respective channels, redundant bits exist.

It is considered that particularly in the case where bit allocation amounts are fixed every respective channels, redundancy as described above becomes more conspicuous.

The present Assignee proposed in JP Patent Application No. 6-206702 (not laid open as yet) corresponding to U.S.

patent application Ser. No. 08/327,282 a technique of determining channel bit allocation based upon the amplitude information to the respective channels or time changes of the sum of scale factors.

The present Assignee already proposed in PCT/J 94/00880 (International Publication Bo. W094/28633, date of international publication, Dec. 8, 1994, a technique of separating the input acoustic signal into tonal components having the energy concentrated in a specific frequency and components having the energy smoothly distributed in a broad frequency range, that is noisy or non-tonal components, and encoding the respective components for achieving a high encoding efficiency.

SUMMARY OF THE INVENTION

In view of the foregoing, it is an object of the present invention to provide a method and apparatus whereby waste in the quantity of bit allocation (byte allocation) for multi-channel compression processing may be eliminated and whereby the encoding efficiency may be improved especially for tonal acoustic signals without deteriorating the sound quality for assuring high-quality compression processing an decoding.

In one aspect, the present invention provides a method for encoding the information including converting the input information signals of plural channels into frequency components, separating the frequency components into a first signal made up of tonal components and a second signal made up of other components from one channel to another, encoding the first signal from one channel to another, and encoding the second signal with the number of bits adaptively allocated among the channels based upon the signals of the entire channels. The present invention also provides an apparatus for carrying out the method for encoding the information.

In another aspect, the present invention provides a method for decoding the information in which a code string obtained by converting input information signals of plural channels into frequency components, separating the frequency components into a first signal made up of tonal components and a second signal made up of other components from one channel to another, encoding the first signal from one channel to another, and encoding the second signal with the number of bits adaptively allocated among the channels based upon the signals of the entire channels is decoded. The decoding method includes separating the code string into a code of the first signal and a code of the second signal, from one channel to another, decoding the code of the first signal and the code of the second signal for producing the first signal made up of tonal components and the second signal made up of other components, and synthesizing the first and second signals. The present invention also provides an apparatus for carrying out the method for decoding the information.

The byte allocation means calculates the amount of byte allocation with respect to time changes of the sum of scale factors at the time of signal encoding of the second signal of each channel based on psychoacoustic characteristics in accordance with a predetermined calculation equation and determines the amounts of bytes allocated to the respective channels based upon calculated results.

The byte allocation means also calculates approximate amounts of bytes to be apportioned to the respective channels in accordance with a predetermined conversion equation and allocates the bytes of the respective channels in proportion to the approximate amounts in order to maintain the total byte allocation quantity constant.

According to the present invention, when compression processing audio data of plural channels, the first signal made up of tonal components of the respective channels are directly encoded using a required number of bits, while the second signal made up of other signals, that is noise components, is encoded based upon an amount of channel-based byte allocation which is determined based upon time changes of the sum of scale factors of the respective channels. This enables byte allocation to respective channels in numbers in meeting with the information amounts of the respective channels.

In addition, according to the present invention, when compression processing audio signals having plural channels, the tonal components of the respective channels are first encoded independently from channel to channel. The noise components of the respective channels are encoded based upon the amounts of channel-based byte allocation determined on the basis of time changes of the sum of the scale factors of the noise components. Thus the tonal components most important to the hearing sense can be encoded with sufficiently high precision, while the noise components, which are not important to the hearing sense, can be encoded with the minimum precision, thus enabling highly efficient signal compression. In addition, the amount of bytes allocated to the noise components of the respective channels can be matched to the information volume of the noise components of the respective channels, thus enabling a higher sound quality and lower bit rate.

Since a fixed processing length is occasionally desired depending on the type of the recording medium, the total amount of byte allocation for the entire channels may be set so as to be substantially constant.

Since the byte allocation amount to the noise components of the respective channels is determined by time changes of the sum of the scale factors of the noise components of the respective channels, the amount of bytes allocated to the respective channels may be matched to the information volume of the noise components.

DESCRIPTION OF PREFERRED EMBODIMENTS

Figure 1:
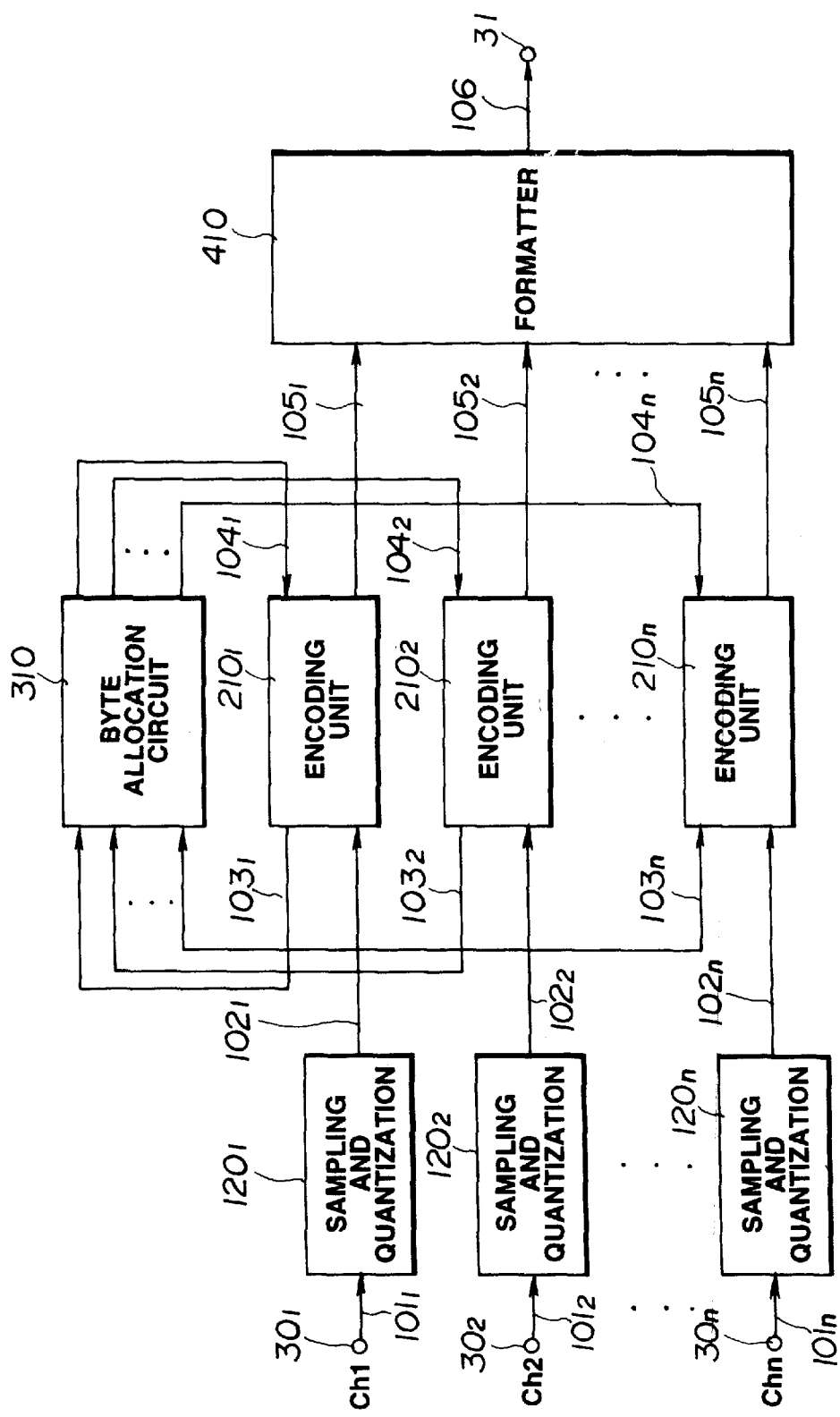
FIG. 1 is a schematic block circuit diagram showing the construction of a signal encoder according to the present invention.

Referring to the drawings, preferred illustrative embodiments of the present invention will be explained in detail.

Figure 2:
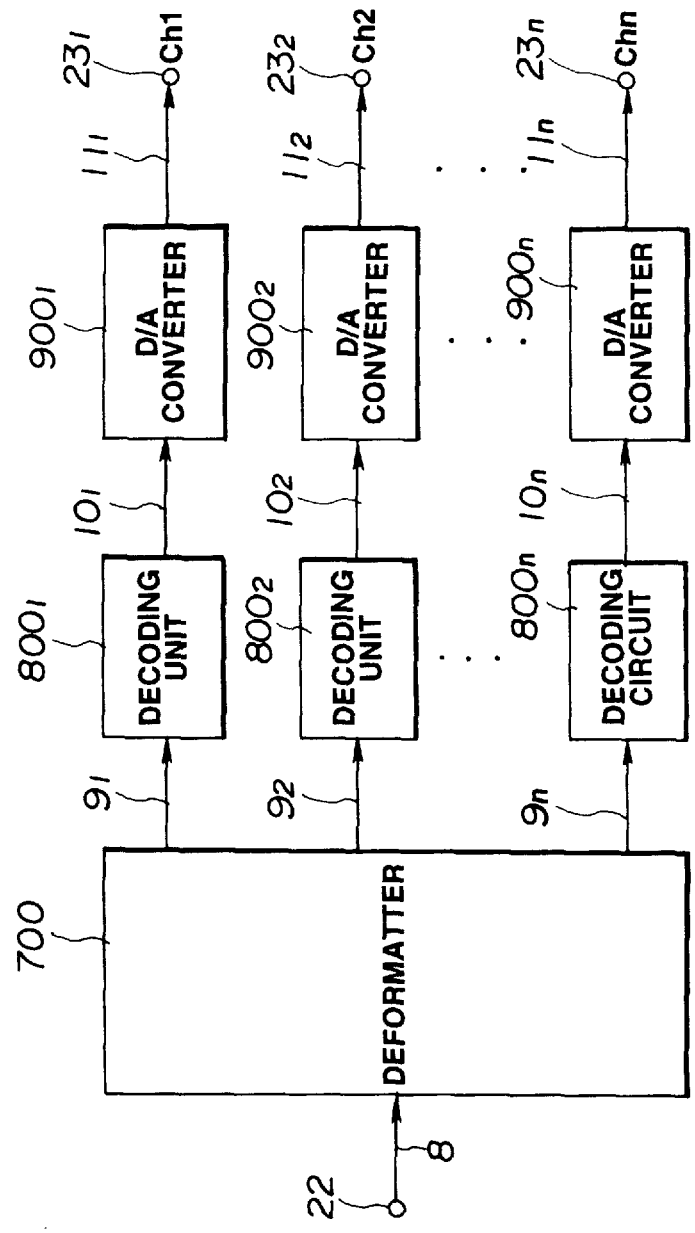
FIG. 2 is a schematic block circuit diagram showing the construction of a signal decoder according to the present invention.

FIGS. 1 and 2 illustrate a basic construction of an apparatus according to a first embodiment of the present invention. FIGS. 1 and 2 illustrate respectively the construction of an information encoding apparatus (encoder) and an information decoding apparatus (decoder) according to a first embodiment of the present invention.

The instruction of the encoder shown in FIG. 1 is first explained.

In FIG. 1, audio signals of plural channels (ch1, ch2, . . . chn) and routed to associated input terminals $30_1$ to $30_n$ and transmission lines $101_1$ to $101_n$ to associated sampling and quantization units $120_1$ to $120_n$, respectively. The audio signal of the respective channels are converted in the sampling and quantization units $120_1$ to $120_n$ into quantized signals. The quantized signals from the sampling and quantization units $120_1$ to $120_n$ are routed via transmission lines $102_1$ to $102_n$ to encoding units $210_1$ to $210_n$, respectively.

The encoding units $210_1$ to $210_n$ divide the audio signals of each channel into two-dimensional areas of time and frequency (block floating units) and signal components belonging to the block floating units are normalized, using scale factors or normalization coefficients, from one block floating unit to another. Of the spectral signals, obtained by converting signals from the time domain into the frequency domain, a first signal of tonal components is normalized for each extracted tonal component, using an independent scaling factor. The second signal, that is components other than the tonal components, are normalized for each block floating unit, using scale factors. The scale factors for each block floating unit of the second signal, thus found, are transmitted to a byte allocation circuit 310 on transmission lines $103_1$ to $103_n$ on the channel basis.

The byte allocation circuit 310 finds the sum of the scale factors, transmitted thereto over the transmission lines $103_1$ to $103_n$, for each sound frame from one channel to another. The byte allocation circuit 310 also finds the amount of byte allocation for each sound frame for each channel from the sum in accordance with a conversion equation (conversion graph) as later explained and routes the amount of byte allocation thus found to the encoding units $210_1$ to $210_n$ over transmission lines $104_1$ to $104_n$. The amount of byte allocation in this case corresponds to the total number of allocated bytes of the entire channels less the number of bits or bytes required for quantizing the tonal components. Each sound frame is made up of, for example, 52 block floating units.

Thus the encoding units $210_1$ to $210_n$ separate the signals over the transmission lines $102_1$ to $102_n$ into the first signal of the tonal components and the second signal of other components and re-quantize the first signal with a required number of bits, while re-quantizing the second signal depending on the amount of byte allocation from the byte allocation circuit 310. The encoding units $210_1$ to $210_n$ transmit the re-quantized (compressed) signals over transmission lines $105_1$ to $105_n$ to a formatter 410.

The formatter 410 assembles the multi-channel encoded signals, supplied thereto over the transmission lines $105_1$ to $105_n$, into a bitstream for transmission or recording on a recording medium in accordance with a pre-set format. This bitstream is outputted via an output terminal 31 over a transmission line 106.

The construction of a decoder (information decoding apparatus) of the present embodiment is now explained.

The bitstream, assembled by the encoder (information encoding apparatus) of FIG. 1, is transmitted or recorded/reproduced on or from a recording medium and is then supplied to an input terminal 22 via which it is routed over a transmission line 8 to a deformatter 700.

The deformatter 700 resolves the bitstream, transmitted thereto over the transmission line 8, into channel-based encoded signals in accordance with a pre-set format. The encoded signals, resolved on the channel basis, are routed over transmission lines $9_1$ to $9_n$, associated with the respective channels, to decoding units $800_1$ to $800_n$ associated with the respective channels.

The decoding units $800_1$ to $800_n$ expand the compressed signals, transmitted thereto over the transmission lines $9_1$ to $9_n$, and route the expanded signals over associated transmission lines $10_1$ to $10_n$ to digital-to-analog (D/A) converters $900_1$ to $900_n$, respectively.

The D/A converters $900_1$ to $900_n$ convert the expanded signals (digital signals), transmitted over the transmission lines $10_1$ to $10_n$, into analog signals. These analog signals are outputted via associated transmission lines $11_1$ to $11_n$ and output terminals $23_1$ to $23_n$ as decoded signals of the respective channels ch1 to chn.

Figure 3:
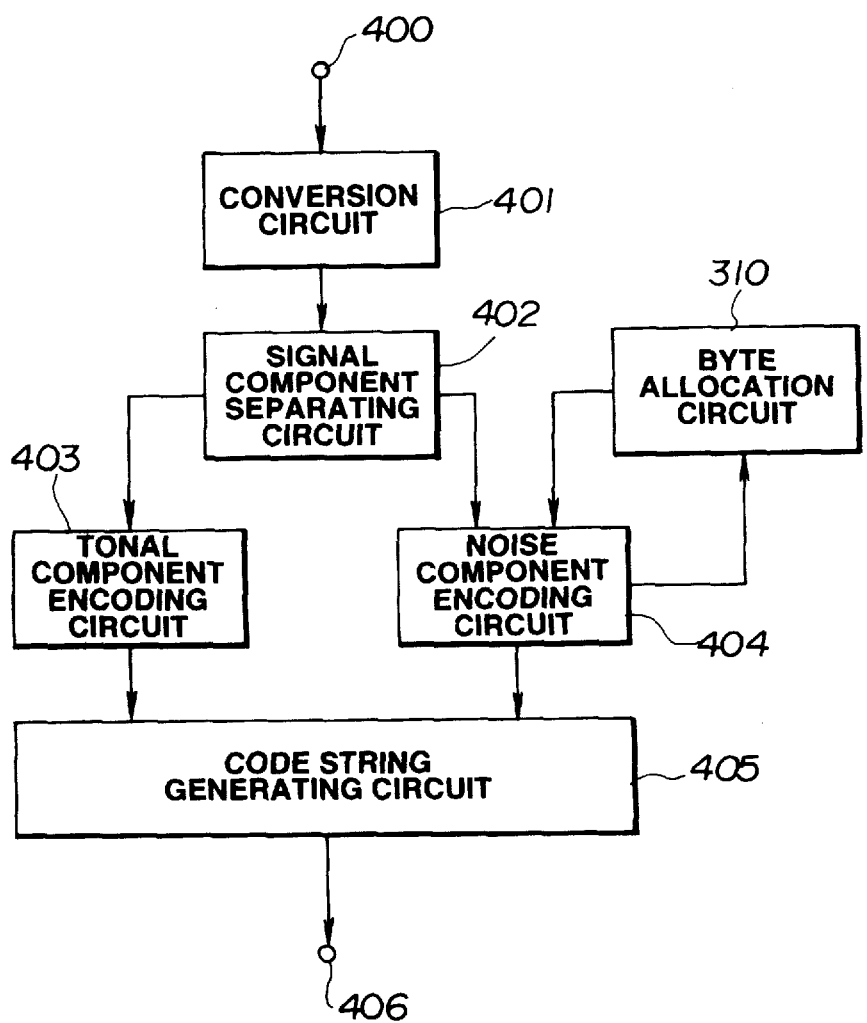
FIG. 3 is a block circuit diagram showing an illustrative encoding unit shown in FIG. 1.

Referring to FIG. 3, a typical construction of the encoding units $210_1$ to $210_n$ employed for the encoder shown in FIG. 1 is explained. It is noted that explanation is made with reference to only one channel since the construction is the same for the respective channels.

Referring to FIG. 3, digital audio signals from one of the sampling and quantization unit $102_1$ to $120_n$ of an arbitrary channel are fed to a terminal 400. These digital audio signals are converted by a converting circuit 401 into frequency components which are supplied to a signal component separating circuit 402.

Figure 10:
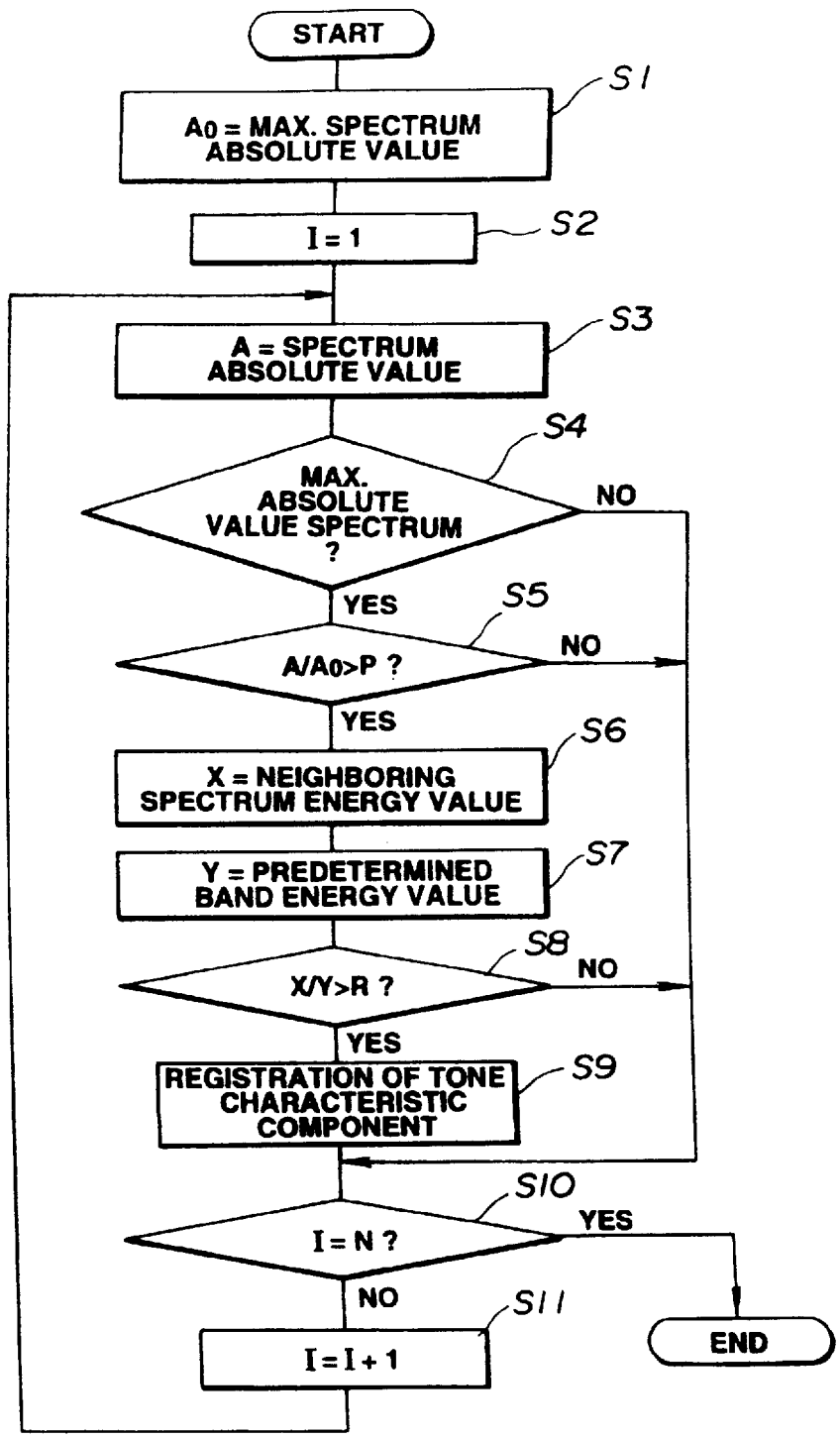
FIG. 10 is a flowchart showing flow of processing in the signal component separating circuit according to the present invention.

The signal component separating circuit 402 separates the signal frequency components from the converting circuit 401 into tonal components having acute spectral distribution, that is the first signal, and noise components having moderate spectral distribution, that is the second signal. Of these, the tonal components having acute spectral distribution are encoded by a tonal component encoding circuit 403, while the remaining components, that is the noise components, are encoded by a noise component encoding circuit 404. The technique of separating the frequency components into the tonal components and the noise components is discussed in detail in the above-referenced PCT/JP94/00880. FIG. 10 shows flow of actual processing for separating tone characteristic component in signal component separating circuit 402 of encoding apparatus of FIG. 3.

In FIG. 10, I denotes No. of spectrum signals, N indicates total number of spectrum signals, and P, R indicate predetermined coefficients. Moreover, the above-mentioned tone characteristic component is determined on the basis of the following consideration. Namely, in the case where absolute value of a certain spectrum signal is greater than other spectrum components when locally viewed, difference between the absolute value and the maximum value of absolute value of spectrum signals in corresponding time block (block in spectrum transform processing) is a predetermined value or more, and sum of that spectrum and neighboring spectrum components (e.g., spectrum components adjoining thereto in both directions) indicates a predetermined ratio or more with respect to energy within a predetermined band including those spectrum components, that spectrum signal and, e.g., spectrum signals adjoining thereto in both directions are considered to be tone characteristic component. It should be noted that, as a predetermined band for comparison of ratio of energy distribution, there may be employed a band such that bandwidth is narrow in a lower frequency band and is broad in higher frequency band in correspondence with, e.g., critical bandwidth by taking the property of the hearing sense into consideration.

Namely, in FIG. 10, initially, at step S1, maximum spectrum absolute value is substituted for variable A0. At step S2, No. I of spectrum signal is set to 1. At step S3, a certain spectrum absolute value within a certain time block is substituted for variable A.

At step S4, whether or not the spectrum absolute value is the maximum absolute value spectrum greater than other spectrum components when locally viewed is judged. As a result, when it is not the maximum absolute value spectrum (No), the processing operation proceeds to step S10. In contrast, in the case where it is the maximum absolute value spectrum (Yes), the processing operation proceeds to step S5.

At step S5, ratio between variable A of the maximum absolute value spectrum in corresponding time block including the maximum absolute value spectrum and variable A0 of the maximum spectrum absolute value and coefficient P indicating a predetermined magnitude are compared (A/A0>P). As a result, in the case where A/A0 is greater than P (Yes), the processing operation proceeds to step S6. In contrast, in the case where A/A0 is less than P (No), the processing operation proceeds to step S10.

At step S6, energy value of neighboring spectrum (e.g., sum of energies of spectrum components adjoining to corresponding spectrum in both directions) of spectrum of the spectrum absolute value (maximum absolute value spectrum) is substituted for variable X. At the subsequent stop S7, energy value within a predetermined band including the maximum absolute value spectrum and the neighboring spectrums thereof is substituted for variable Y.

At the subsequent step S8, ratio between variable X of the energy value and variable Y of energy value within a predetermined band and coefficient indicating a predetermined ratio are compared (X/Y>R). As a result, when X/Y is greater than R (Yes), the processing operation proceeds to step S9. In contrast, when X/Y is less than R (No), the processing operation proceeds to step S10.

At step S9, in the case where the energy in the maximum absolute value spectrum and the neighboring spectrum components thereof indicates a predetermined ratio or more with respect to energy within a predetermined band including those spectrum components, signal of its maximum absolute value spectrum component and, e.g., signals of spectrum components adjoining thereto in both directions are considered to be tone characteristic component to register that fact. At the subsequent step S10, whether or not No. I of spectrum signal registered at the step S9 and total number N of spectrum signals are equal to each other (I=N) is judged. As a result, in the case where they are 55 equal to each other (Yes), the processing is completed. In contrast, in the case where they are not equal to each other (No), the processing operation proceeds to step S11. At this step S11, I is set to I=I+1 to increase (increment) No. of spectrum signals by one. Thus, the processing operation returns to step S3 to repeat the above-mentioned processing.

The tonal components are uniquely quantized in accordance with the number of bytes responsive to the peak values or energy or a pre-set number of bytes. As for the noisy components, the quantity of byte allocation for each channel is determined responsive to the information on the quantity of byte allocation from the byte allocation circuit 310, and the number of bits for each block floating unit is determined within the quantity of the allocated bytes.

Specifically, the scale factor for each block floating unit in the noise component encoding circuit 404 is routed to the byte allocation circuit 310 where the sum of the scale factors is found. The byte allocation circuit 310 finds the sum of the channel-based scale factors for the entire channels and determines the number of bytes allocated to an arbitrary channel depending on the ratio of the sum for the channel to the sum for the entire channels. Meanwhile, the amount of bytes allocated to the entire channels corresponds to the total amount of bytes determined by the data transmission rate of the entire channels less the sum of the numbers of bits required for quantizing the channel-based tonal components.

Outputs of the tonal component encoding circuit 403 and the noise component encoding circuit 404 are assembled by a code string generating circuit 405 into a code string which is taken out at a terminal 406 so as to be transmitted to the formatter 410 of FIG. 1.

Meanwhile, the formatter 410 is fed not only with the re-quantized data of the tonal components and the noisy components but also data specifying the scale factor and word length (number of quantization bits) of each of the tonal components and data specifying the scale factor of each noise component for each block floating unit. When the tonal components are re-separated by the signal component separating circuit 402, the information specifying the position of the tonal components on the frequency axis are taken out simultaneously and fed to the formatter 410.

Figure 4:
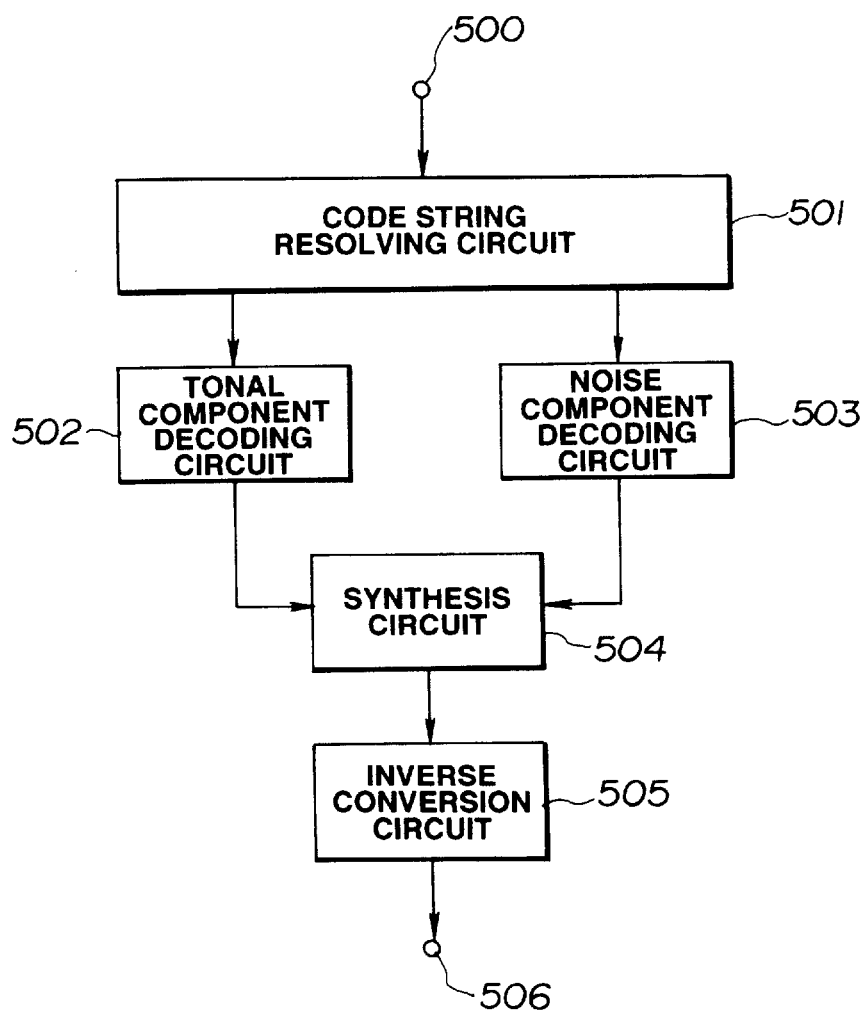
FIG. 4 is a block circuit diagram showing an illustrative decoding unit used in FIG. 2.

FIG. 4 shows, in a block circuit diagram, an illustrative construction of decoding units $800_1$ to $800_n$ employed for the decoder shown in FIG. 2 is explained. The construction is explained with reference to only one channel since it is the same for the respective channels.

Referring to FIG. 4, the encoded signals fed via a terminal 500 are separated by a code string resolving circuit 501 into a tonal component code and a noise component code. The tonal component code and the noise component code are fed to a tonal component decoding circuit 502 and a noise component decoding circuit 503, respectively, for decoding. Outputs of the tonal component decoding circuit 502 and the noise component decoding circuit 503 are synthesized by a synthesis circuit 504 performing an inverse operation of that performed by the signal component separating circuit 402 shown in FIG. 3. During this synthesis, the tonal components are synthesized with the noise components based upon the position information of the tonal components. An output of the synthesis circuit 504 is fed to an inverse conversion circuit 505 which performs an inverse operation of that performed by the converting circuit 401 of FIG. 3 so as to be converted from the frequency domain into the time domain. An output time-domain waveform signal from the inverse conversion circuit 505 is taken out at a terminal 506 and routed to D/A converters $900_1$ to $900_n$ of FIG. 2.

Figure 5:
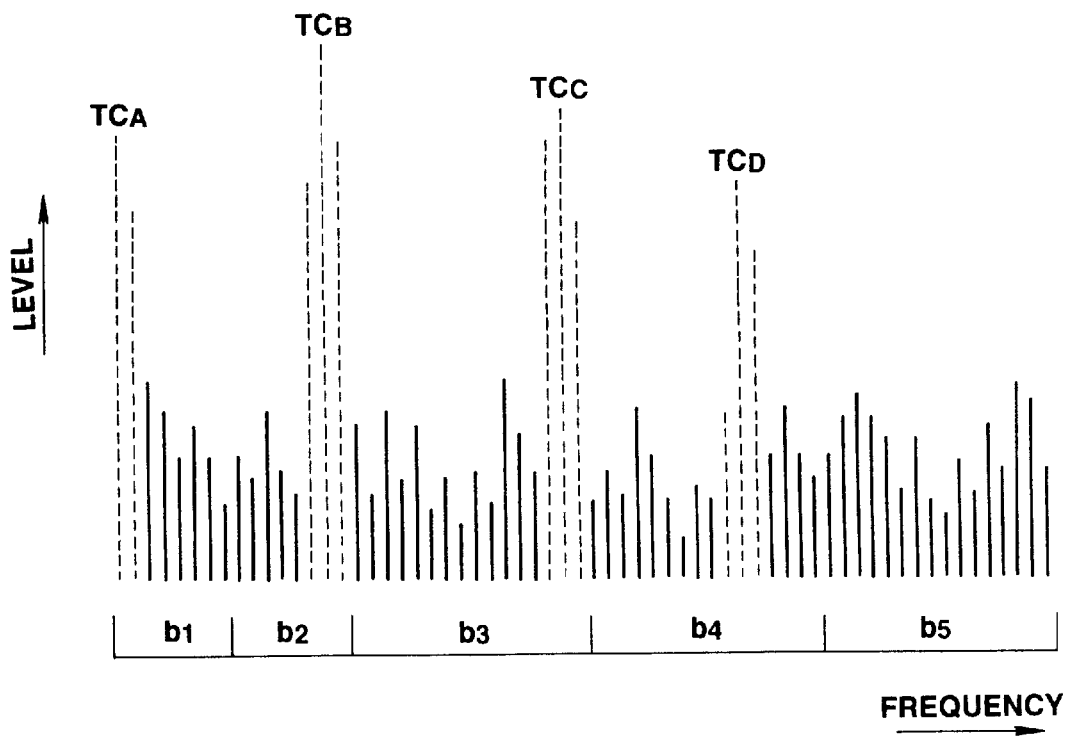
FIG. 5 is a graph for illustrating tonal components of a spectral signal.
Figure 6:
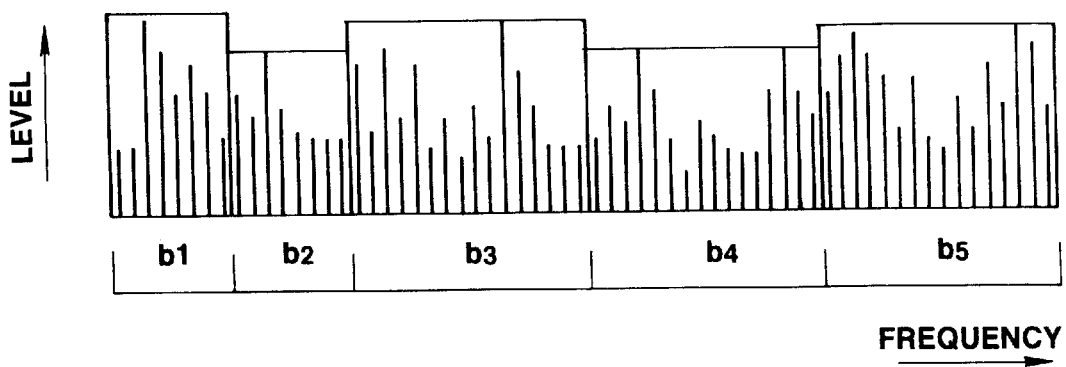
FIG. 6 is a graph for illustrating noise components of a spectral signal.

FIGS. 5 and 6 show illustrative examples of spectral signals when encoding is to be performed according to the method described above. That is, FIGS. 5 and 6 illustrate the manner in which the spectral signals from the converting circuit 401 are fed to the signal component separating circuit 402 for separating the tonal components and the manner in which the noise components separated from the tonal components are routed to the noise component encoding circuit 404, respectively. In these figures, the entire frequency spectrum is split into five bands b1 to b5 to form the floating block units or encoding units. However, the block floating units or encoding units may be formed in a different manner within the scope of the present invention.

In the example of FIG. 5, four tonal components $TC_A$, $TC_B$, $TC_C$, $TC_D$ are extracted. It is noted that tonal components are concentrated in a few spectral signals, as shown in FIG. 5, so that a large number of bits are not required on the whole in quantizing these components with fine quantization steps. Although it is possible to normalize and subsequently quantize the tonal components for improving the encoding efficiency, the processing for normalization or re-quantization may be omitted for simplification of the device since a relatively small number of spectral signals make up the tonal component.

FIG. 6 shows the noise components obtained by subtracting the tonal components of FIG. 5 from the original spectral signal. In the present case, the noise signal is obtained by subtracting the encoded and subsequently decoded tonal components from the original spectral signal.

As shown in FIG. 6, since the tonal components are subtracted in this manner from the original spectral signal, the normalization coefficient in each encoding unit is of a small value and hence the quantization noise generated may be diminished even with the use of a smaller number of bits.

With the above system in which the encoded and subsequently decoded tonal components are subtracted from the original signal to produce noise components, tonal components may further be extracted from the produced noise components. While a small quantity of the tonal components are left in the noise components of FIG. 6, it is also possible as an alternative system to separate the tonal and noise components completely in the signal component separating circuit 402 and to transmit the noise component having the tonal component set to zero to the noise component encoding circuit 404.

Figure 7:
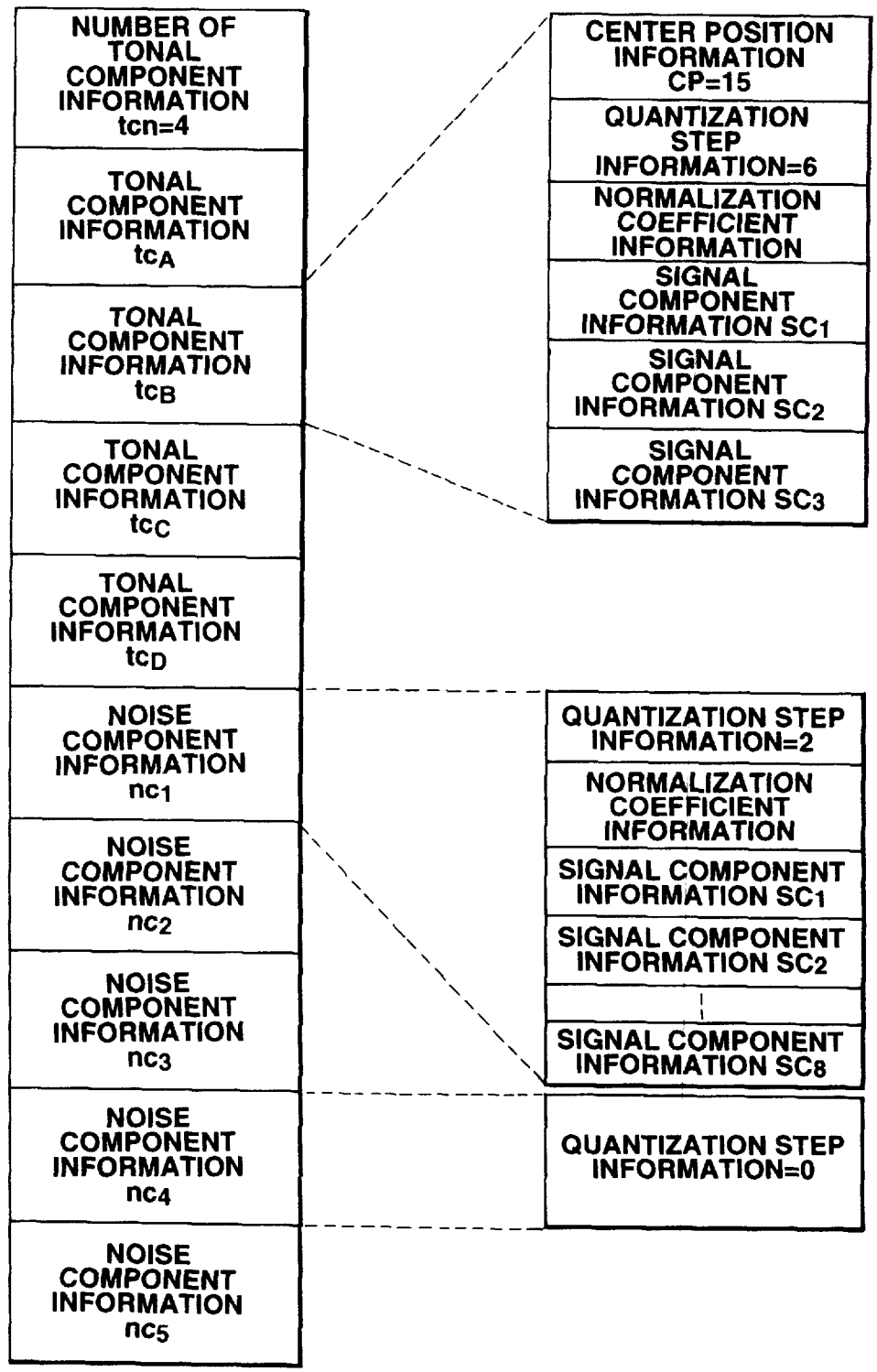
FIG. 7 illustrates an example of a code string obtained on encoding according to the encoding method of the present invention.

FIG. 7 shows an illustrative example of a code string obtained on encoding the spectral signal shown in FIGS. 5 and 6, for example, the code string recorded on, for example, a recording medium.

In the example shown in FIG. 7, the number of tonal component information data $t_{cn}$ indicating the number of the tonal components, for example, $t_{cn}=4$ in the example of FIG. 5, is recorded on the recording medium. The tonal component information data $tc_A$, $tc_B$, $tc_C$, $tc_D$ which are encoded data of signals of the tonal components $TC_A$, $TC_B$, $TC_C$, $TC_D$, and noise component information data $nc_1$, $nc_2$, $nc_3$, $nc_4$ and $nc_5$ which are data obtained on encoding the bands b1 to b5 of the noise component signals of FIG. 6, are recorded in this sequence.

For each of the tonal component information data $tc_A$, $tc_B$, $tc_C$, $tc_D$, there are recorded center position information data CP specifying the position of the center spectrum, as the position of the tonal component on the frequency axis, the quantization step information, specifying the number of bits for quantization, normalization coefficient information data specifying the scale factor or the normalization coefficient, and signal component information data, which is the data corresponding to normalized and quantized signals of the tonal component. For the tonal component $TC_B$, the center position information CP=15 and the number of the quantization step information data=6, these data being recorded along with the signal component information data $SC_1$, $SC_2$ and $SC_3$ as encoded data of three spectral signals of the tonal component $TC_B$.

Of course, there is no necessity of recording the quantization step information data if the quantization step is fixedly set in dependence upon the frequency. While the position of the center spectral component is employed in the above example as the position information of the tonal components, it is also possible to record the lower most spectral component of the tonal components, which is 14 with the tonal components $TC_B$.

As for the noise component information data, the quantization step information data and the normalization coefficient information data are recorded along with the normalized and quantized signal component information data. For example, for the noise component information data $nc_1$ for the band b1, the quantization step information data=2 and the normalization coefficient information data are recorded along with the signal component information data $SC_1$, $SC_1$, ... $SC_8$.

As for the information data for a band for which the quantization step information data, that is the number of quantization bit information data, is set to zero, for example, the noise component information data $nc_4$ in FIG. 7, only the quantization step information data=0 is recorded, while the normalization coefficient information data or the respective signal component information data is not recorded. If the quantization step is pre-set fixedly for a band, there is no necessity of recording the quantization step information data. However, since it becomes impossible in this case to specify an encoding unit in which encoding in effect is not performed, a 1-bit flag data may be appended for specifying whether or not encoding is actually performed in each encoding unit.

For encoding the noise component, the quantity of bytes apportioned for each channel is determined based upon the sum of the scale factors of the noise components of the entire channels. The scale factors or the normalization coefficients are coefficients for normalizing frequency components contained in the band or the floating unit. The maximum value of absolute values of the frequency components in the floating unit are usually selected as the coefficient value.

That is, since the scale factors are deemed to be a value representing a given block floating unit, the sum of the scale factors is thought to be effective in estimating the entire information quantity.

Figure 8:
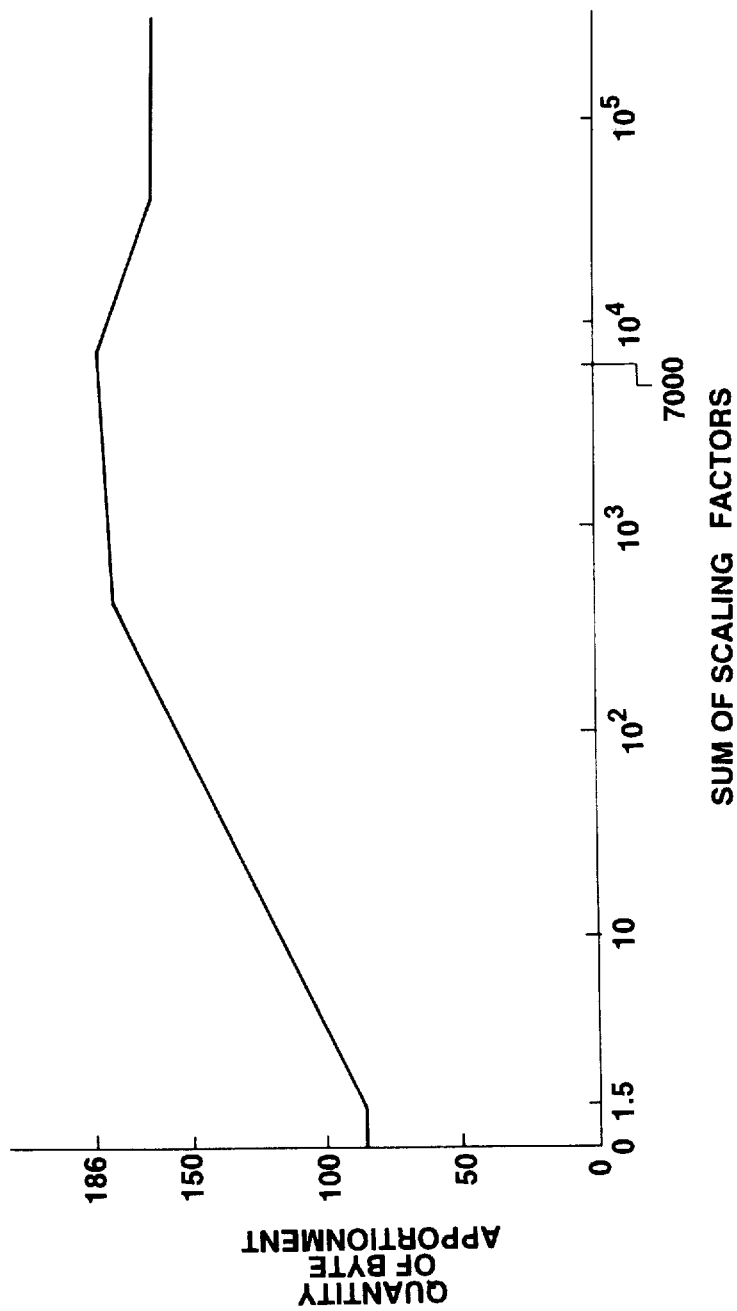
FIG. 8 is a graph for illustrating the quantity of byte allocation among different channels when re-quantizing noise components.

FIG. 8 shows the amount of byte allocation plotted against the sum of scale factors in the byte allocation circuit of FIG. 1. In FIG. 8, the ordinate and the abscissa indicate the amount of byte allocation, with the maximum allocation amount being 186, and the sum of the scale factors, respectively.

The graph for conversion of FIG. 8 is formulated based upon the results of experiments using various audio signals. The general tendency of the graph is that the amount of byte allocation is increased with increase in the sum of the scale factors. However, this does not hold at a value of the sum of scale factors exceeding about 7000. This reflects the experimental results that, for a larger value of the sum of the scale factors, the signal level is larger and the quantization noise by re-quantization is masked by the signal level so that amount of the re-quantization noise introduced is perceptible to a lesser extent. On the other hand, the constant amount of byte allocation for the value of the sum of the scale factors not more than 1.5 reflects the necessity of procuring the information data amount for the substantially constant information amounts for the parameter information data, such as word length or scale factor data.

If, in the present embodiment, it is necessary to fix the total amount of byte allocation for the entire channels, calculations of the equation (1)

$$S_Ni=(G-Gr)\times C_Ni/(C_N1+C_N2+\ldots+C_Nn) \quad (1)$$

are carried out after the above-described calculations in order to find the amount of channel-based byte allocation. In the equation (1), $S_Ni$ (i=1, 2, ..., n) is the amount of ultimate bit allocation to the noise components of respective channels, G is the amount of total bit allocation per sound frame as an encoding unit on the time axis for a system having n channels, Gr is the amount of bit allocation to the tonal components of the entire channels and $C_Ni$ is the amount of byte allocation to the noise components of the respective channels by the conversion by FIG. 8.

Figure 9:
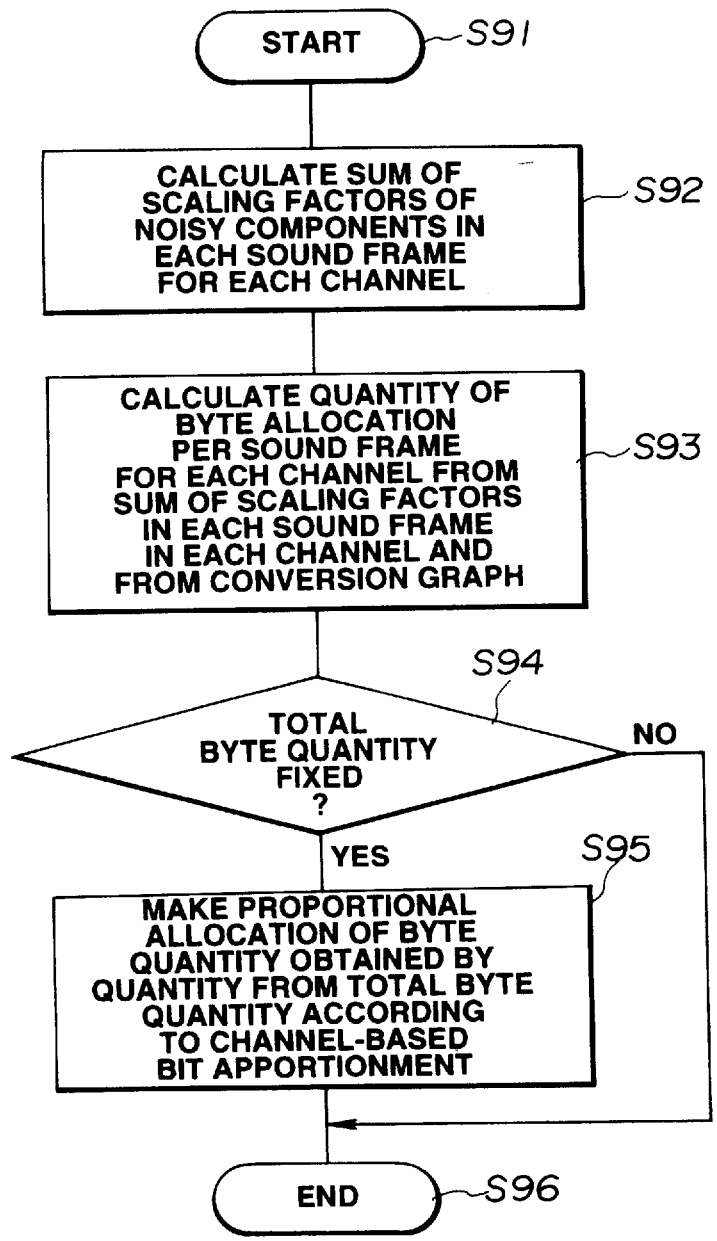
FIG. 9 is a flow chart for illustrating the operation of determination of byte allocation for noise components in the embodiment of the present invention.

The detailed operation of the byte apportionment circuit 310 is explained by referring to a flow chart of FIG. 9.

The byte allocation circuit 310 starts its operation at step S91 in FIG. 9. From the scale factors of the noise components from the encoders $210_1$ to $210_n$, the byte allocation circuit 310 calculates at step S91 the sum of scale factors of the noise components in each sound frame for each channel.

At the next step S93, the byte allocation circuit 310 calculates, from the sum of the scale factors, thus found, the amount of byte allocation of the noise components per sound frame per channel.

At the next step S94, the byte allocation circuit 310 judges whether or not the total byte quantity should be fixed. If it is judged at step S94 that the total amount of byte allocation should be fixed, the byte allocation circuit 310 transfers to step S95 where calculations of the equation (1) are carried out for ultimately finding the amount of byte allocation per sound frame per channel.

After step S95, or if the result of judgement at step S94 is NO, the byte allocation circuit 310 transfers to step S96 to terminate the operation.

Although the amount of byte allocation is calculated on a sound frame basis, it may be calculated based on some other unit.

In the information encoding device of the present embodiment, the formatter 410 arrays data routed from the encoding units $210_1$ to $210_n$ of the respective channels for each sound frame in the channel sequence and transmits the data as a bitstream. That is, the formatter operates as a multiplexor.

In the information decoding device of the present embodiment, the deformatter operates as a demultiplexor resolving the data multiplexed by the formatter 410 into channels and routing the channel-based data to the respective decoding units.

The scale factors, word lengths and the sound frame are discussed in great detail in the above referenced JP Patent Application No. 6-206702 (1994) corresponding to U.S. patent application Ser. No. 08/327,282.

The present Assignee already proposed a technique of separating and encoding the tonal components and the noise components in International Application No. PCT/JP94/01056 (International Publication WO95/01680, date of International Publication, Jan. 12, 1995; European Patent Application Publication No. 0645769 A2, date of publication of application Mar. 29, 1995 Bulletin 95/13; International Application No. PCT/JP94/01863, and International Application No. PCT/JP95/00635, in addition to the above referenced PCT/JP94/00880. The technique disclosed in these applications may be applied to the embodiments disclosed herein.

What is claimed is:

1. A method for encoding audio information, comprising the steps of:

converting input information signals of plural channels into frequency components;

separating the frequency components into a first signal made up of tonal components and a second signal made up of other components from one channel to another;

encoding said first signal from one channel to another; and encoding said second signal with a number of bits adaptively allocated among the plural channels based upon the second signals of the plurality of channels.

2. The method for encoding audio information as claimed in claim 1, wherein step of encoding the second signal comprises the steps of:

adaptively allocating bits with respect to time changes of the sum of scale factors at the time of encoding of said second signal of the respective channels based upon psychoacoustic characteristics in accordance with a predetermined calculation equation; and determining the amount of bits allocated to the respective channels based upon results of said calculations.

3. The method for encoding audio information as claimed in claim 1, wherein said step of encoding said second signal comprises the steps of:

calculating an approximate amount of bits to be allocated to the respective channels in accordance with a predetermined conversion equation; and allocating the bits of the respective channels in proportion to the approximate amount in order to maintain the total bit allocation quantity constant.

4. An apparatus for encoding audio information, comprising:

converting means for converting input information signals of plural channels into frequency components;

separating means for separating the frequency components into a first signal made up of tonal components and a second signal made up of other components from one channel to another;

first encoding means for encoding said first signal; second encoding means for encoding said second signal; and byte allocating means for determining amounts of byte allocation to the plural channels for encoding said second signal based upon information of the second signals of respective channels.

5. The apparatus for encoding audio information as claimed in claim 4, wherein said byte allocation means calculates the amount of byte allocation with respect to time changes of the sum of scale factors at the time of encoding of said second signal of the respective channels based upon psychoacoustic characteristics in accordance with a predetermined calculation equation and determines the amount of bytes allocated to the respective channels based upon results of said calculations.

6. The apparatus for encoding audio information as claimed in claim 4, wherein said byte allocation means calculates an approximate amount of bytes to be allocated to the respective channels in accordance with a predetermined conversion equation and allocates the bytes of the respective channels in proportion to the approximate amount in order to maintain the total byte allocation quantity constant.

7. A method for decoding audio information in which a code string obtained by converting input information signals of plural channels into frequency components, separating the frequency components into a first signal made up of tonal components and a second signal made up of remaining components from one channel to another, encoding said first signal from one channel to another, and encoding said second signal with the number of bits adaptively allocated among the channels based upon the signals of the entire channels is decoded, comprising the steps of:

separating said code string into a code of said first signal and a code of said second signal, from one channel to another;

decoding said code of said first signal and the code of said second signal for producing the first signal made up of tonal components and the second signal made up of other components; and synthesizing said first and second signals.

8. An apparatus for decoding audio information, comprising:

code string resolving means for resolving a code string of plural strings into a code of a first signal made up of tonal components and a code of a second signal made up of other components;

first decoding means for decoding the code of said first signal from said code string resolving means from one channel to another;

second decoding means for decoding the code of said second signal from said code string resolving means from one channel to another; and synthesizing means for synthesizing signals of said first and second decoding means from one channel to another.

* * * * *

UNITED STATES PATENT AND TRADEMARK OFFICE
CERTIFICATE OF CORRECTION

PATENT NO.: 5,870,703
DATED: February 9, 1999
INVENTOR(S): YOSHIAKI OIKAWA ET AL.

It is certified that an error appears in the above-identified patent and that said Letters Patent is hereby corrected as shown below:

On the title page item [57],
In the Abstract, line 4, "comment" should be ---component--.

Signed and Sealed this

Fourteenth Day of September, 1999

Attest:

Q. TODD DICKINSON

*Attesting Officer*     *Acting Commissioner of Patents and Trademarks*